US005608418A

United States Patent [19]

McNally

[11] Patent Number: 5,608,418
[45] Date of Patent: Mar. 4, 1997

[54] FLAT PANEL DISPLAY INTERFACE FOR A HIGH RESOLUTION COMPUTER GRAPHICS SYSTEM

[75] Inventor: Sean M. McNally, Mountain View, Calif.

[73] Assignee: Sun Microsystems, Inc., Mountain View, Calif.

[21] Appl. No.: 441,262

[22] Filed: May 15, 1995

Related U.S. Application Data

[63] Continuation of Ser. No. 188,521, Jan. 28, 1994, abandoned.

[51] Int. Cl.$^6$ .................................................. G09G 5/00
[52] U.S. Cl. ........................................ 345/3; 345/1
[58] Field of Search .......................... 345/3, 186, 199, 345/1

[56] References Cited

U.S. PATENT DOCUMENTS

| | | | |
|---|---|---|---|
| 4,808,989 | 2/1989 | Tabata | 345/190 |
| 5,111,190 | 5/1992 | Zenda | 345/60 |
| 5,138,305 | 8/1992 | Tomiyasu | 345/3 |
| 5,159,683 | 10/1992 | Lvovsky | 345/3 |

FOREIGN PATENT DOCUMENTS

| | | | |
|---|---|---|---|
| 0354480 | 3/1989 | European Pat. Off. | 345/3 |
| 0471275A2 | 2/1992 | European Pat. Off. | |
| 0520454A2 | 12/1992 | European Pat. Off. | |
| WO90/02409 | 2/1993 | WIPO | |
| WO93/06587 | 4/1993 | WIPO | |

*Primary Examiner*—Steven Saras
*Assistant Examiner*—Kent Chang
*Attorney, Agent, or Firm*—Blakely Sokoloff Taylor & Zafman LLP

[57] ABSTRACT

A computer graphics subsystem is disclosed that renders images on either a high resolution CRT display or a high resolution flat panel display without requiring modifications to existing application programs. The graphics subsystem includes a ramdac circuit that generates a set of video sync signals for a CRT display. The ramdac circuit has an analog video port and a digital pixel output port. The ramdac circuit performs color look-up table and digital to analog conversion functions to drive a high resolution CRT display through the analog video output port. The ramdac circuit uses the digital pixel port to enable the computer graphics subsystem to drive a flat panel display. A color buffer circuit converts the video sync signals into a set of flat panel sync signals for a flat panel display.

24 Claims, 9 Drawing Sheets

FIG. 9

FLAT PANEL DISPLAY INTERFACE FOR A HIGH RESOLUTION COMPUTER GRAPHICS SYSTEM This is a continuation of application Ser. No. 08/188,521 filed Jan. 28, 1994, now abandoned.

BACKGROUND OF THE INVENTION

1. Field of the Invention

The present invention pertains to the field of computer graphics systems. More particularly, this invention relates to interfacing high resolution flat panel displays to computer graphics systems that employ high resolution CRT displays.

2. Art Background

High performance computer graphics systems typically employ high resolution CRT displays to generate high resolution images. Typically, application programs executing on a host processor of such a computer graphics system generate geometry data that defines graphical elements for display on the high resolution CRT. In such a graphics system, the application programs typically transfer the geometry data from the host processor to a graphics subsystem. The graphics subsystem then renders the high resolution images defined by the geometry data onto the CRT display.

Recent advances in semiconductor technology have enabled designers to reduce the size and weight of the processor subsystems, memory subsystems, and graphics rendering subsystems of such high performance computer graphics systems. As a consequence, the electronics housing for such computer graphics systems may be relatively small and lightweight. Unfortunately, the high resolution CRT displays of such graphics systems remain relatively large and unwieldy. The size and weight of high resolution CRT displays increases the desktop space required by such high performance computer graphics systems, thereby rendering such systems more intrusive in a work environment.

Flat panel displays may be retrofitted onto existing computer graphics systems to reduce the overall system size and weight. Such a retrofit of flat panel displays may also provide some degree of portability to new and existing computer graphics systems. Unfortunately, flat panel displays usually do not provide the high pixel display resolutions that characterize the higher performance computer graphics systems.

Nonetheless, lower resolution flat panel displays may be employed to reduce the overall size and weight of such graphics systems. However, existing high resolution computer graphics systems typically require major modifications to the graphics subsystem to accommodate the lower resolution flat panel displays. In addition, existing application programs for such computer graphics systems usually require extensive modifications for compatibility with the lower resolution flat panel displays. Such modifications increase the cost of developing smaller and lighter weight computer graphics systems that drive flat panel displays.

SUMMARY OF THE INVENTION

A computer graphics subsystem is disclosed that renders images on either a high resolution CRT display or a high resolution flat panel display. The computer graphics subsystem enables existing high resolution rendering hardware and software to drive a flat panel display without requiring modifications to existing application programs.

The computer graphics subsystem includes a ramdac circuit coupled to receive a pixel data stream corresponding to an image rendered into a frame buffer by a rendering processor. The pixel data stream defines the image for display on a display device. The ramdac circuit generates a set of video sync signals for a CRT display.

The ramdac circuit has an analog video output port and a digital pixel output port. The ramdac circuit performs color look-up table and digital to analog conversion functions to drive a high resolution CRT display through the analog video output port. The ramdac circuit performs color look-up table functions for color flat panel displays. The ramdac circuit also has a color look-up bypass mode for monochrome flat panel displays. The ramdac circuit uses the digital pixel output port to enable the computer graphics subsystem to transfer digital pixel data for a flat panel display.

The computer graphics subsystem also includes a color buffer circuit for driving the flat panel display. The color buffer circuit receives the digital pixel data through the digital pixel output port of the ramdac circuit. The color buffer circuit receives the video sync signals from the ramdac circuit, and converts the video sync signals into a set of flat panel sync signals for a flat panel display. The color buffer circuit demultiplexes the digital pixel data from the ramdac circuit, and transfers the pixel data and the flat panel sync signals to the flat panel display. The flat panel sync signals synchronize the pixel data to generate the image on the flat panel display.

DETAILED DESCRIPTION

Figure 1:
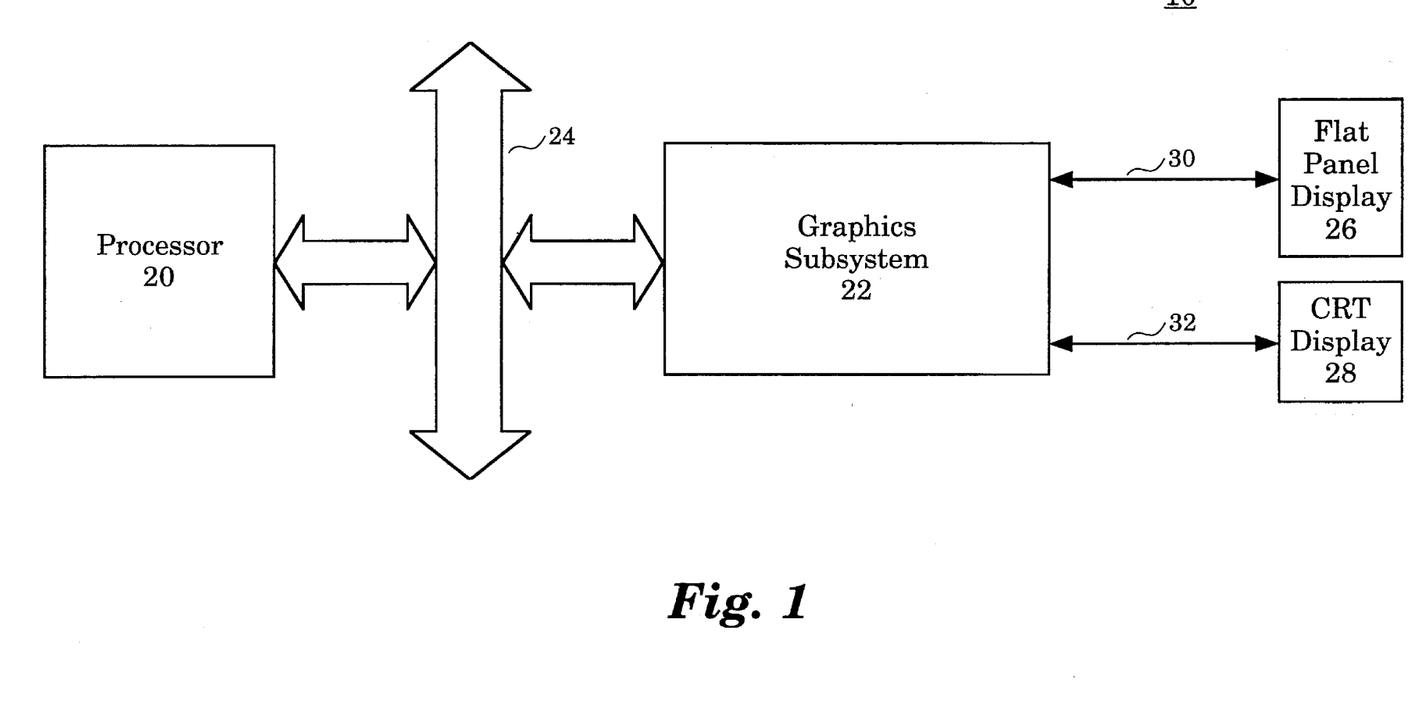
FIG. 1 illustrates a computer graphics system which comprises a processor, a graphics subsystem, a flat panel display, and a CRT display.

FIG. 1 illustrates a computer graphics system 10. The computer graphics system 10 comprises a processor 20, a graphics subsystem 22, a flat panel display 26, and a CRT display 28. The processor 20 communicates with the graphics subsystem 22 over a system bus 24.

The processor 20 executes computer graphics application programs. The computer graphics application programs generate graphics data that define graphical elements for display. The processor 20 transfers graphics data to the graphics subsystem 22 over the system bus 24. The processor 20 also accesses graphics data from the graphics subsystem 22 over the system bus 24 for interactive computer graphics application programs.

The graphics subsystem 22 processes the graphics data received from the processor 20 and renders the corresponding graphical elements onto the flat panel display 26 or the CRT display 28. The graphics subsystem 22 communicates with the CRT display 28 over a set of CRT interface lines 32. The CRT interface lines 32 transfer the red, green and blue video signals and video sync signals for generating images on the CRT display 28. For one embodiment, the CRT display 28 is high resolution "workstation size" CRT display with 1024×768 or 1152×900 pixel resolution.

The graphics subsystem 22 communicates with the flat panel display 26 over a set of flat panel interface lines 30. The flat panel interface lines 30 transfer the digital pixel data and synchronization signals for generating images on the flat panel display 26. For one embodiment, the flat panel display 26 is a high resolution color flat panel display with 1024× 768 pixel resolution or 1152×900 pixel resolution. For another embodiment, the flat panel display 26 is a high resolution 1-bit monochrome flat panel display with 1152× 900 pixel resolution.

The CRT interface lines 32 transfer CRT sense signals that indicate the pixel resolution of the CRT display 28 and that indicate whether the CRT display 28 is present. The flat panel interface lines 30 transfer flat panel sense data that indicates the pixel resolution of the flat panel display 26 and whether the flat panel display 26 is monochrome or color.

Figure 2:
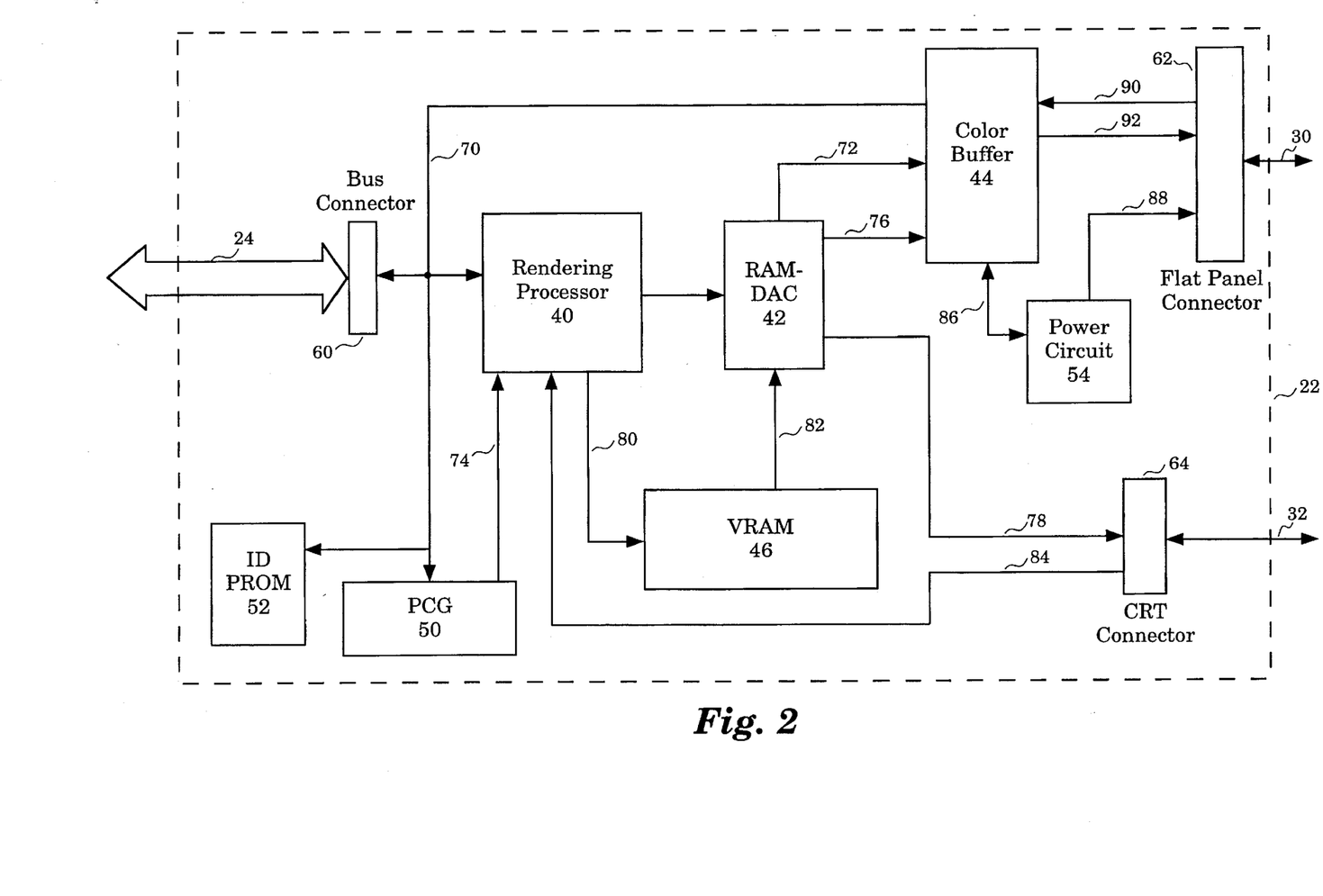
FIG. 2 illustrates the graphics subsystem which comprises a rendering processor, a RAMDAC, a color buffer circuit, a power circuit, and a video random access memory (VRAM)

FIG. 2 illustrates the graphics subsystem 22 for one embodiment. The graphics subsystem 22 comprises a rendering processor 40, a RAMDAC 42, a color buffer circuit 44, a power circuit 54, and a video random access memory (VRAM) 46. A bus connector 60 couples the system bus 24 for communication to the rendering processor 40, the color buffer circuit 44, a programmable clock generator (PCG) circuit 50, and an identifier programmable read only memory (ID-PROM) 52 over a data bus 70.

The processor 20 reads the ID-PROM 52 over the data bus 70. The ID-PROM 52 indicates the configuration of the graphics subsystem 22. The processor 20 programs the PCG circuit 50 over the data bus 70 according to the configuration of the graphics subsystem 22.

The rendering processor 40 receives set of CRT sense signals 84 through a CRT connector 64. The CRT sense signals 84 indicate whether the CRT display 28 is coupled to the CRT interface lines 32. The CRT sense signals 84 also indicate the pixel resolution of the CRT display 28 if present. The processor 20 reads the state of the CRT sense signals 84 from the rendering processor 40 over the data bus 70.

The color buffer circuit 44 receives a set of flat panel sense data 90 from the flat panel display 26 through a flat panel connector 62. The flat panel sense data 90 indicates whether the flat panel display 26 is coupled to the flat panel interface lines 30. The flat panel sense data 90 also indicates whether the flat panel display 26 is color or monochrome if present. The color buffer circuit 44 stores the flat panel sense data 90 in an internal register as sense data bits.

The processor 20 reads the sense data bits from the internal register of the color buffer circuit 44 over the data bus 70 if the CRT sense signals 84 indicate that the CRT display 28 is not coupled to the CRT interface lines 32. The processor 20 uses the sense data bits to determine a configuration for the graphics subsystem 22 to drive the flat panel display 26. The processor 20 accordingly programs the PCG 50, the rendering processor 40, and the RAMDAC 42 to drive the flat panel display 26.

The PCG 50 generates a reference pixel clock 74 for the graphics subsystem 22. The processor 20 programs the PCG 50 to generate the reference pixel clock 74 at a frequency according to the configuration of the graphics subsystem 22 and the pixel frequencies required by either the flat panel display 26 or the CRT display 28.

The rendering processor 40 receives graphics data from the processor 20 over the data bus 70. The rendering processor 40 generates a set of digital pixel data for rendering the graphical elements corresponding to the graphics data generated by the processor 20. The rendering processor 40 transfers the digital pixel data to the VRAM 46 over a video bus 80. The VRAM 46 functions as a frame buffer for the graphical elements rendered by the rendering processor 40.

The RAMDAC 42 generates a set of video sync signals 72. The video sync signals 72 comprise the vertical and horizontal sync and blanking signals required by the CRT display 28. The video sync signals 72 are used to generate the video signals 78 if the CRT display 28 is present. The RAMDAC 42 transfers the video sync signals 72 to the color buffer circuit 44. The color buffer circuit 44 converts the video sync signals 72 into flat panel synchronization signals required by the flat panel display 26 according to the sense data 90.

The RAMDAC 42 implements color look-up table functions and digital to analog conversion functions. The RAMDAC 42 provides an analog video output port and a digital pixel data output port. The processor 20 programs the RAMDAC 42 to enable the analog video output port to drive the CRT display 28 or the digital pixel data output port to drive the flat panel display 26 according to the configuration of the graphics subsystem 22.

The RAMDAC 42 receives the digital pixel data from the VRAM 46 over a pixel bus 82. If the graphics subsystem 22 is configured to drive the CRT display 28, the RAMDAC 42 generates a color pixel data stream by performing color look-up table functions on the digital pixel data stream received from the VRAM 46 over the pixel bus 82. The RAMDAC 42 also generates red, green, and blue video signals by performing a digital to analog conversion function on the color pixel data stream to drive the CRT display 28 if the graphics subsystem 22 is configured to drive the CRT display 28.

The RAMDAC 42 transfers a set of video signals 78 through the analog video output port. The video signals 78 are transferred through the CRT connector 64 to the CRT display 28 over the CRT interface lines 32. The video signals 78 comprise the red, green and blue video signals, as well as video sync signals for the CRT display 28.

If the flat panel display 26 is a color flat panel display, the RAMDAC 42 generates a color pixel data stream by performing color look- table functions on the digital pixel data stream received from the VRAM 46. The RAMDAC 42 transfers the color pixel data stream to the color buffer circuit 44 over a digital pixel bus 76. The RAMDAC 42 transfers the color pixel data stream through the digital pixel data output port to the color buffer circuit 44.

The color buffer circuit 44 receives the color pixel data stream over the digital pixel bus 76 and the video sync signals 72 from the RAMDAC 42 if the flat panel display 26 is a color display. The color buffer circuit 44 generates a flat panel color data stream by demultiplexing the color pixel data stream received over the digital pixel bus 76. The color buffer circuit 44 converts the video sync signals 72 from the video format required by a CRT into a set of color flat panel synchronization signals required by the flat panel display 26. The color buffer circuit 44 transfers the flat panel color data stream and the color flat panel synchronization signals over a set of flat panel data lines 92 through the flat panel connector 62 to the flat panel display 26.

If the flat panel display 26 is a monochrome display, the RAMDAC 42 bypasses the color look-table functions on the digital pixel data stream received from the VRAM 46. The RAMDAC 42 transfers the digital pixel data stream from the VRAM 46 through to the color buffer circuit 44 over the digital pixel bus 76. The RAMDAC 42 transfers the digital pixel data stream through the digital pixel data output port to the color buffer circuit 44.

The color buffer circuit 44 receives the digital pixel data stream over the digital pixel bus 76 and the video sync signals 72 from the RAMDAC 42 if the flat panel display 26 is a monochrome display. The color buffer circuit 44 generates a flat panel monochrome data stream from the digital pixel data stream received over the digital pixel bus 76. The color buffer circuit 44 converts the video sync signals 72 from the video format required by a CRT into the monochrome flat panel synchronization signals required by the flat panel display 26. The color buffer circuit 44 transfers the flat panel monochrome data stream and the monochrome flat panel synchronization signals over the flat panel data lines 92 to the flat panel display 26.

The power circuit 54 contains a set of power transistors for providing the 5 volt and 12 volt supplies required the flat panel display 26. The color buffer circuit 44 generates a set of power control signals 86. The power control signals cause the power circuit 54 to generate the proper sequence of 5 volt and 12 volt power to the flat panel display 26 on a set of power lines 88. The power applied to the power lines 88 provide the proper sequence for powering up and powering down the flat panel display 26.

Figure 3:
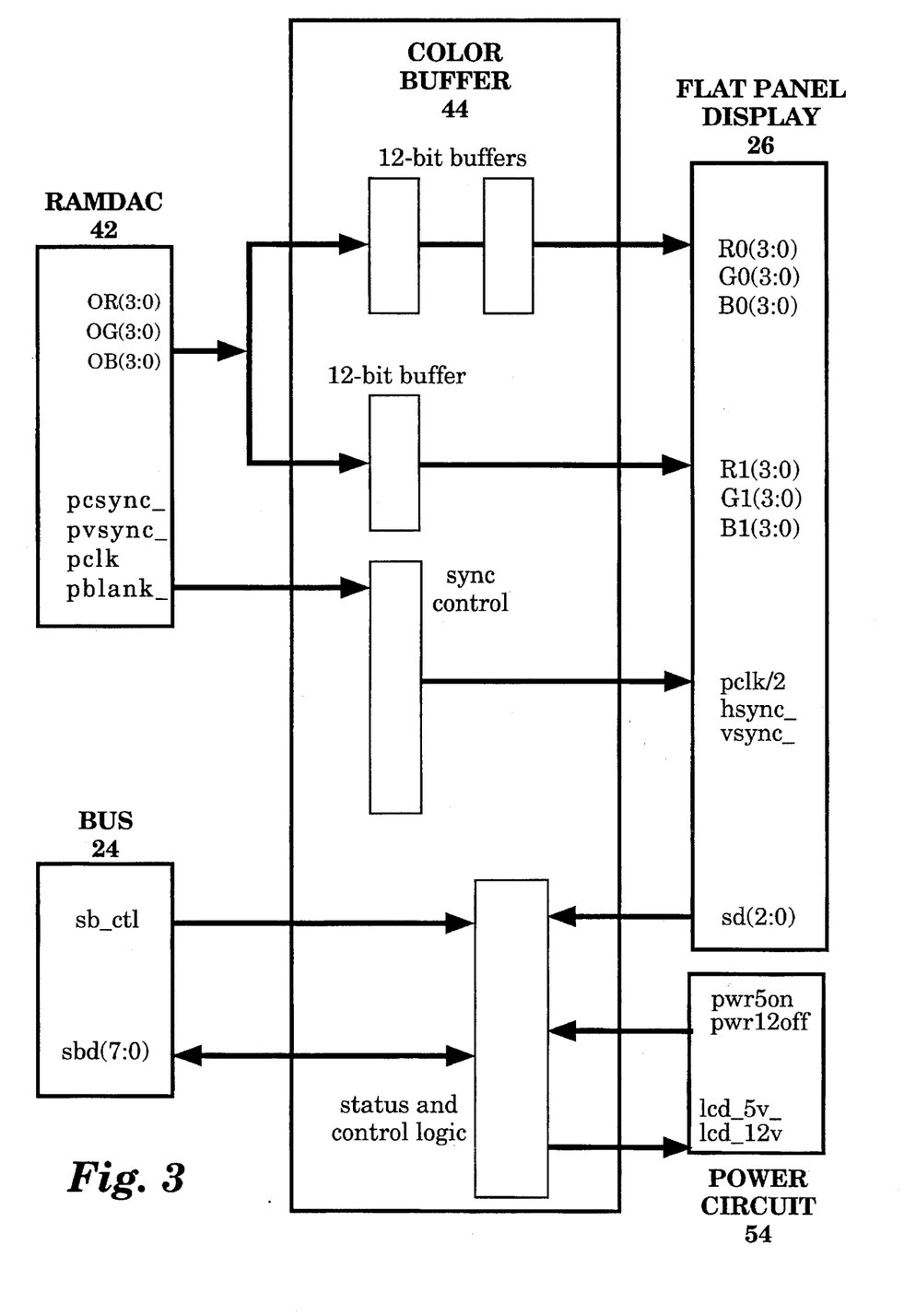
FIG. 3 functionally illustrates the interface between the RAMDAC, the processor, the color buffer circuit, and the flat panel display.

FIG. 3 functionally illustrates the interface between the RAMDAC 42, the processor 20, the color buffer circuit 44 and the flat panel display 26. The processor 20 accesses the status and control logic in the color buffer circuit 44 via system bus data (sbd) and system bus control (sb_ctl) signals over the system bus 24.

The color buffer circuit 44 contains a video register that control the backlight and front panel functions of the flat panel display 26. The processor 20 accesses the video register in the color buffer circuit 44 over the data bus 70 to control the backlight and front panel functions.

The color buffer circuit 44 contains a status register that stores individual bits indicating the state of the flat panel sense data 90 from the flat panel display 26. The processor 20 accesses the status register of the color buffer circuit 44 over the data bus 70. The processor 20 reads the status register in the color buffer circuit 44 to determine whether the flat panel display 26 is coupled to the flat panel interface lines 30. The status register of the color buffer circuit 44 also indicates whether the flat panel display 26 is color or monochrome.

The sense bits in the status register of the color buffer circuit 44 also indicate the resolution of the flat panel display 26. For one embodiment, the flat panel display 26 may comprise an 1152×900 display, an 1152×900 monochrome display, or a 1024×768 color display.

If the flat panel display 26 is a color display, the RAMDAC 42 generates a red (OR), a green (OG), and a blue (OB) color pixel value for each pixel of the digital pixel data stream received from the VRAM 46. For one embodiment, the red, green and blue color pixel values each comprise the upper four bits of the corresponding red, green, and blue color pixel values generated by the color look-up table function of the RAMDAC 42.

If the flat panel display 26 is a monochrome display, the RAMDAC 42 transfers each pixel value of the digital pixel data stream received from the VRAM 46 to the color buffer circuit 44 in place of the OR and OG color pixel values. For one embodiment, the monochrome pixel data values transferred to the color buffer circuit 44 each comprise 8 bits.

The RAMDAC 42 also transfers the video sync signals 72 to the color buffer circuit 44 including a composite sync (pcsync), a vertical sync signal (pvsync), a pixel clock (pclk), and a blanking signal (pblank).

The color buffer circuit 44 buffers and demultiplexes the color pixel data OR, OG, and OB from the RAMDAC 42. If the flat panel display 26 is a color display, the color buffer circuit 44 transfers two color pixel data values to the flat panel display 26 in parallel during each flat panel pixel clock period. The pair of color pixel data values transferred to the flat panel display 26 during each flat panel pixel clock period comprise a red (R0), a green (G0), and a blue (B0) pixel data value for a first pixel and a red (R1), a green (G1), and a blue (B1) pixel data value for a second pixel.

If the flat panel display 26 is a monochrome display, the color buffer circuit 44 transfers one monochrome pixel data value to the flat panel display 26 during each flat panel pixel clock period. Each monochrome pixel data value transferred to the flat panel display 26 comprises 16 bits in place of R0 and R1, and G0 and G1.

The color buffer circuit 44 processes the video sync signals from the RAMDAC 42 and generates the flat panel synchronization signals required by the flat panel display 26. The synchronization signals for the flat panel display 26 comprise a flat panel pixel clock (pclk2), a horizontal sync signal (hsync), a vertical sync signal (vsync), and a set of blanking signals.

Figure 4:
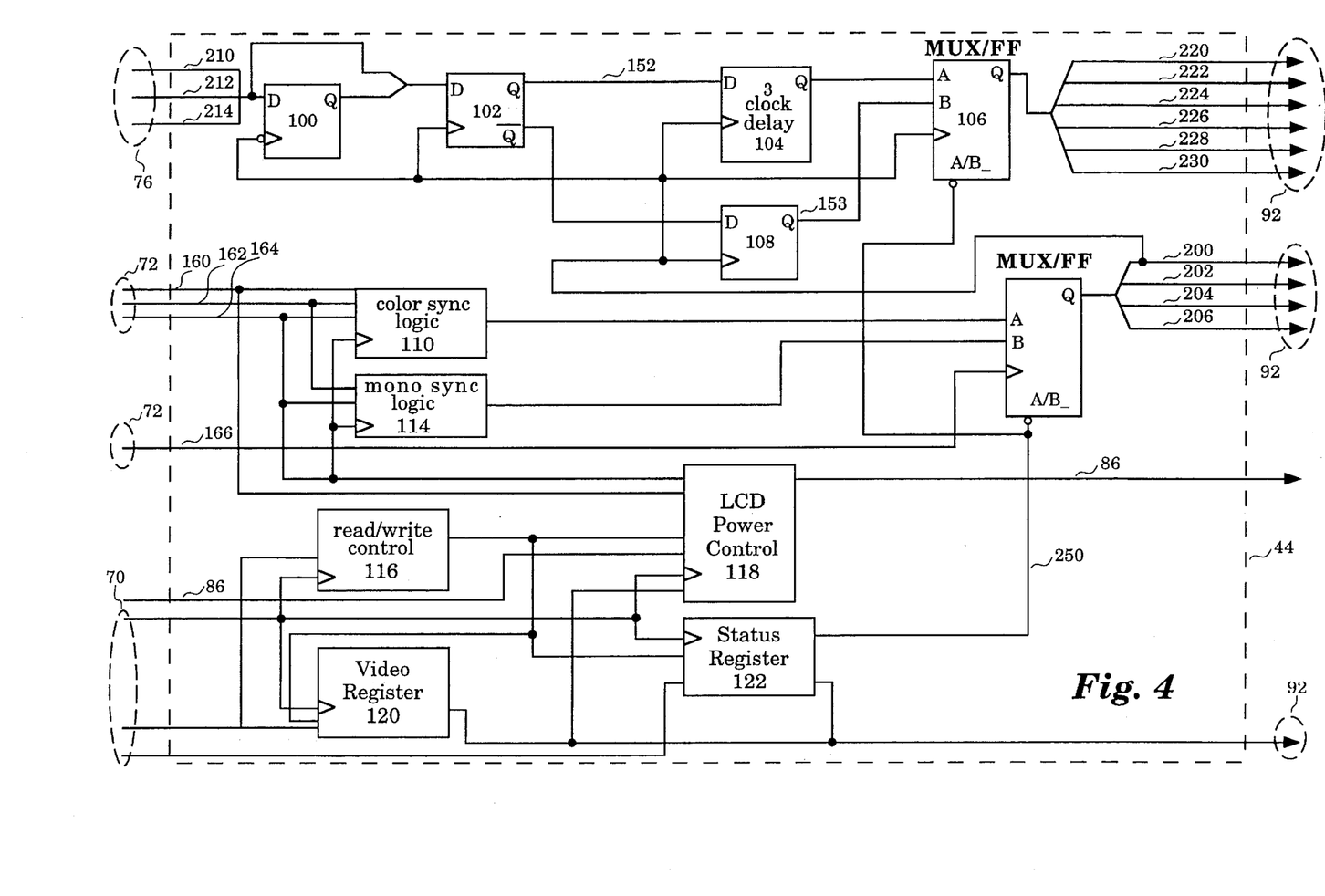
FIG. 4 is a diagram illustrating the color buffer circuit for one embodiment.

FIG. 4 is a diagram illustrating the color buffer circuit 44 for one embodiment. The digital pixel data received over the digital pixel bus 76 comprises a set of ramdac data 210, a set of ramdac data 212, and a set of ramdac data 214.

The ramdac data 210, 212, and 214 each comprise 4 bits of either color flat panel pixel data or flat panel monochrome pixel data according to the type of flat panel display 26, either color or monochrome. The ramdac data 214 comprises 4 bits of color flat panel pixel data for a color flat panel display.

A 12 bit latch 100 and a 24 bit latch 102 demultiplex the digital pixel data received over the digital pixel bus 76. The monochrome flat panel pixel data is latched in a 16 bit latch 108. The 24 bit color flat panel pixel data 152 is delayed by a delay circuit 104. A multiplexer flip-flop 106 couples either the monochrome flat panel pixel data 153 or the color flat panel pixel data to the flat panel data bus 92 according to a control signal 250 from the status register 122. The control signal 250 indicates whether flat panel display 26 is a color display or a monochrome display.

The pixel data on the flat panel data bus 92 comprises multiple sets of flat panel data 220-230. The flat panel data 220 and 222 comprise either red pixel data or monochrome data. The flat panel data 224 and 226 comprise either green pixel data or monochrome pixel data, and the flat panel data 228 and 230 comprise blue pixel data.

A color sync logic circuit 110 and a monochrome sync logic circuit 114 convert the video sync signals 72 into flat panel synchronization signals. The video sync signals 72 comprise a blanking signal 160 (pblank), a horizontal sync signal 162 (phsync), and a vertical sync signal 164 (pbsync).

The color sync logic circuit 110 converts the video sync signals 72 into a set of color flat panel synchronization signals 250. The monochrome sync logic circuit 114 converts the video sync signals 72 into a set of monochrome flat panel synchronization signals 252.

The multiplexer flip-flop circuit 112 transfers either the color flat panel synchronization signals 250 or the monochrome flat panel synchronization signals 252 over the flat panel data bus 92 under control of the control signal 250. The flat panel synchronization signals on the flat panel data bus 92 comprise a flat panel pixel clock 200 (pclk2), a horizontal sync signal 202 (hsync), and a vertical sync signal 206 (vsync).

An LCD power control circuit 118 generates the power control signals 86 to sequence the 5 volt and 12 volt LCD power for the flat panel display 26. A video register 120 controls the backlight functions and panel electronics functions of the flat panel display 26. A status register 122 stores the flat panel sense data 90 received from the flat panel display 26. A read/write control circuit 116 enables the processor 20 to access the video register 120 and the status register 122 over the data bus 70.

Figure 5:
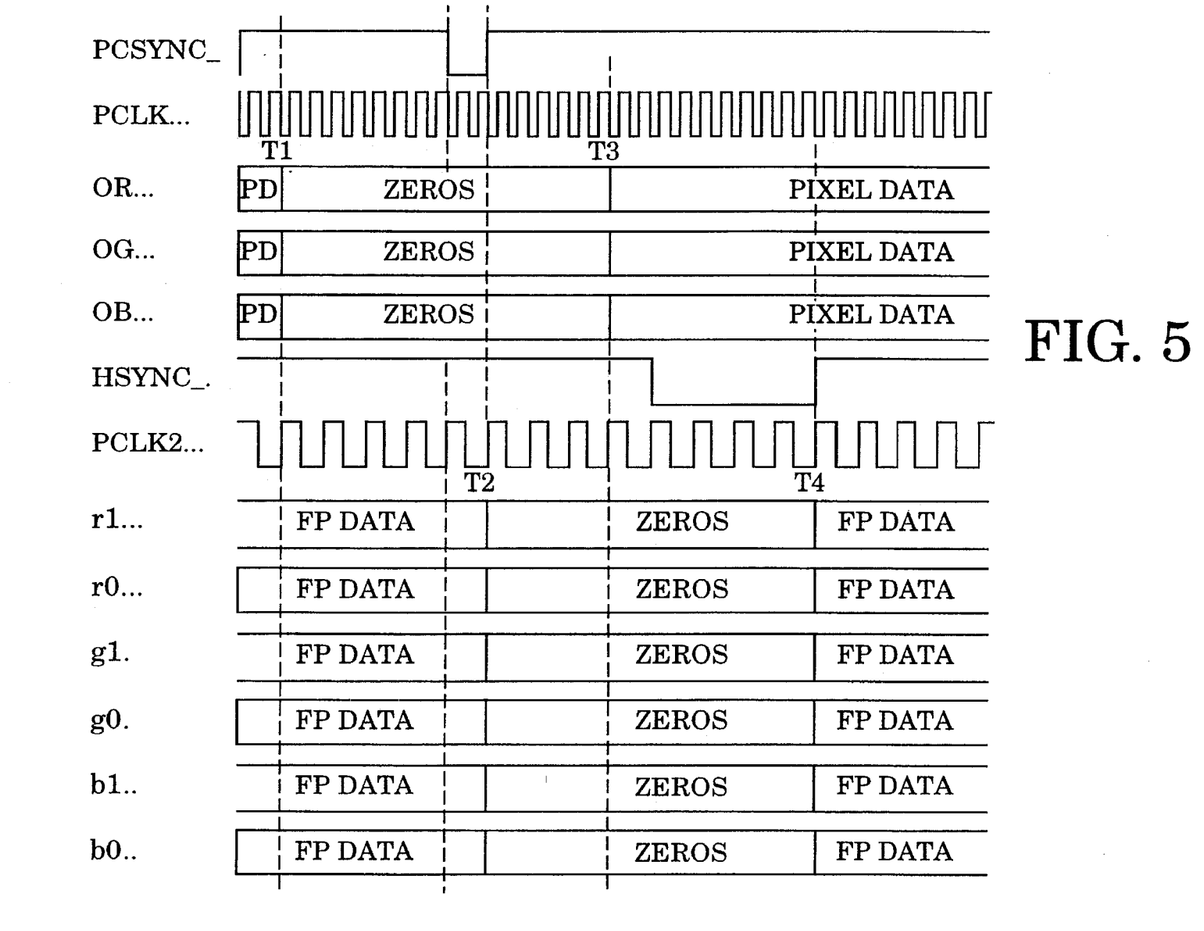
FIG. 5 illustrates the timing of a color flat panel display for one embodiment.

FIG. 5 illustrates the timing of a color flat panel display 26 for one embodiment. The timing diagram illustrates the composite sync signal (pcsync) and the pixel clock 166 (PCLK). The ramdac data 210 comprises the red pixel data (OR), the ramdac data 212 comprises the green pixel data (OG), and the ramdac data 214 comprises the blue pixel data (OB) received from the RAMDAC 42 over the digital pixel bus 76. Also shown is the timing of the horizontal sync signal 202 (HSYNC) and the flat panel pixel clock 200 (PCLK2).

Time T1 is the end of a horizontal scan line for the color CRT display 28. Between times T1 and T3, the red, green and blue pixel data from the digital pixel output port of the RAMDAC 42 is all zeros. Time T3 is the start of a next scan line for the color CRT display 28.

The diagram shows the timing of color flat panel pixel data on the flat panel data bus 92. The flat panel data 220 comprises red pixel data from a first pixel (r0) and the flat panel data 222 comprises red pixel data of a second pixel (r1). The flat panel data 224 comprises green pixel data from a first pixel (g0) and the flat panel data 226 comprises green pixel data from the second pixel (g1). The flat panel data 228 comprises blue color data from the first pixel (b0) and the flat panel data 230 comprises blue color data from the second pixel (b1).

Time T2 is the end of a horizontal line for the color flat panel display 26 and the end of the corresponding color flat panel data stream (FP DATA). Between times T2 and T4, the flat panel data from the color buffer 44 is all zeros. Time T4 is the start of the next horizontal line for the color flat panel display 26 as indicated by HSYNC.

Figure 6:
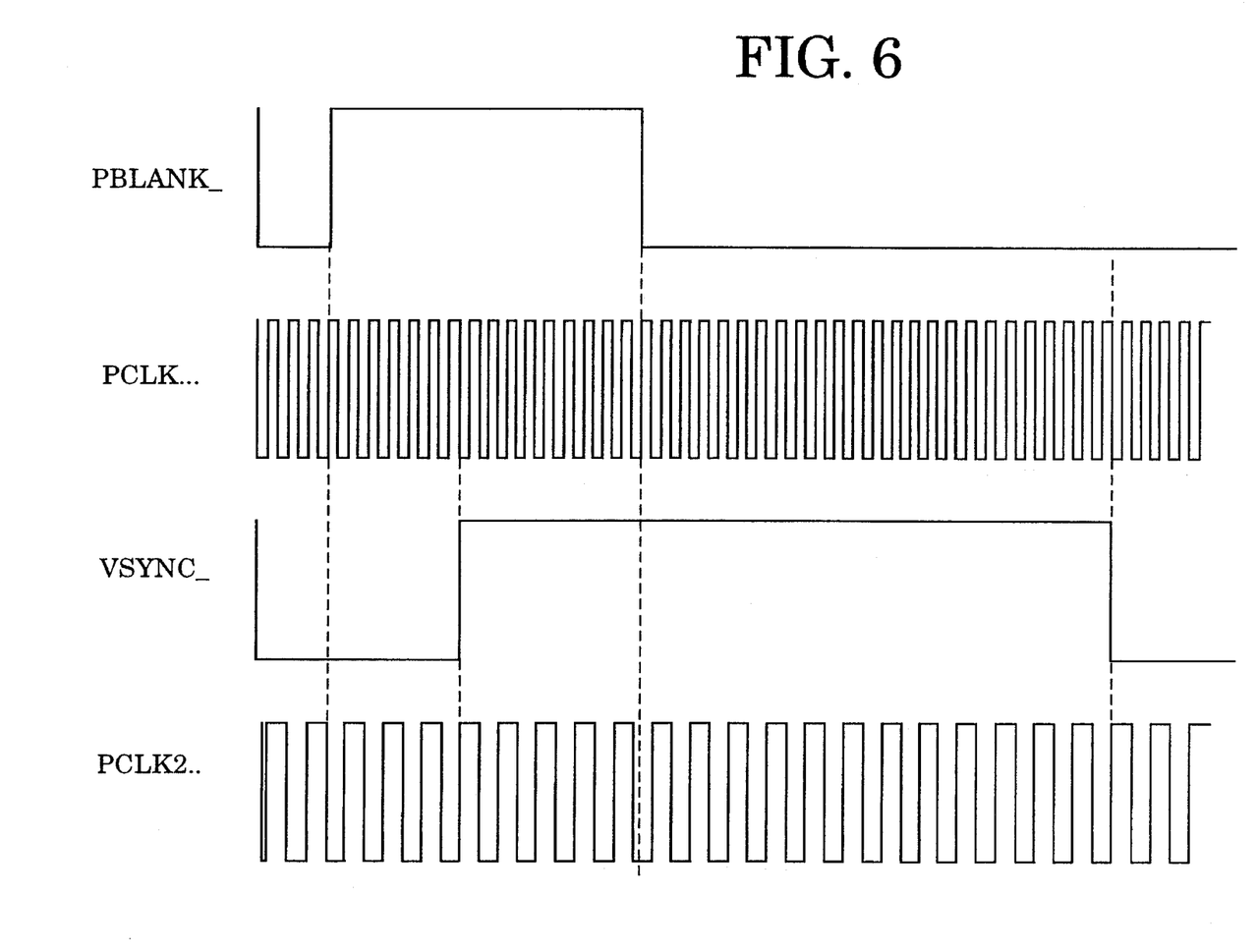
FIG. 6 illustrates the timing of the vertical sync signal for a color flat panel display wherein the vertical sync signal (VSYNC) is triggered by the blanking signal.

FIG. 6 illustrates the timing of the vertical sync signal 206 for a color flat panel display. The vertical sync signal 206 (VSYNC) is triggered by the blanking signal 160 (PBLANK). The diagram also shows the timing of the pixel clock 166 (PCLK) and the flat panel pixel clock 200 (PCLK2).

Figure 7:
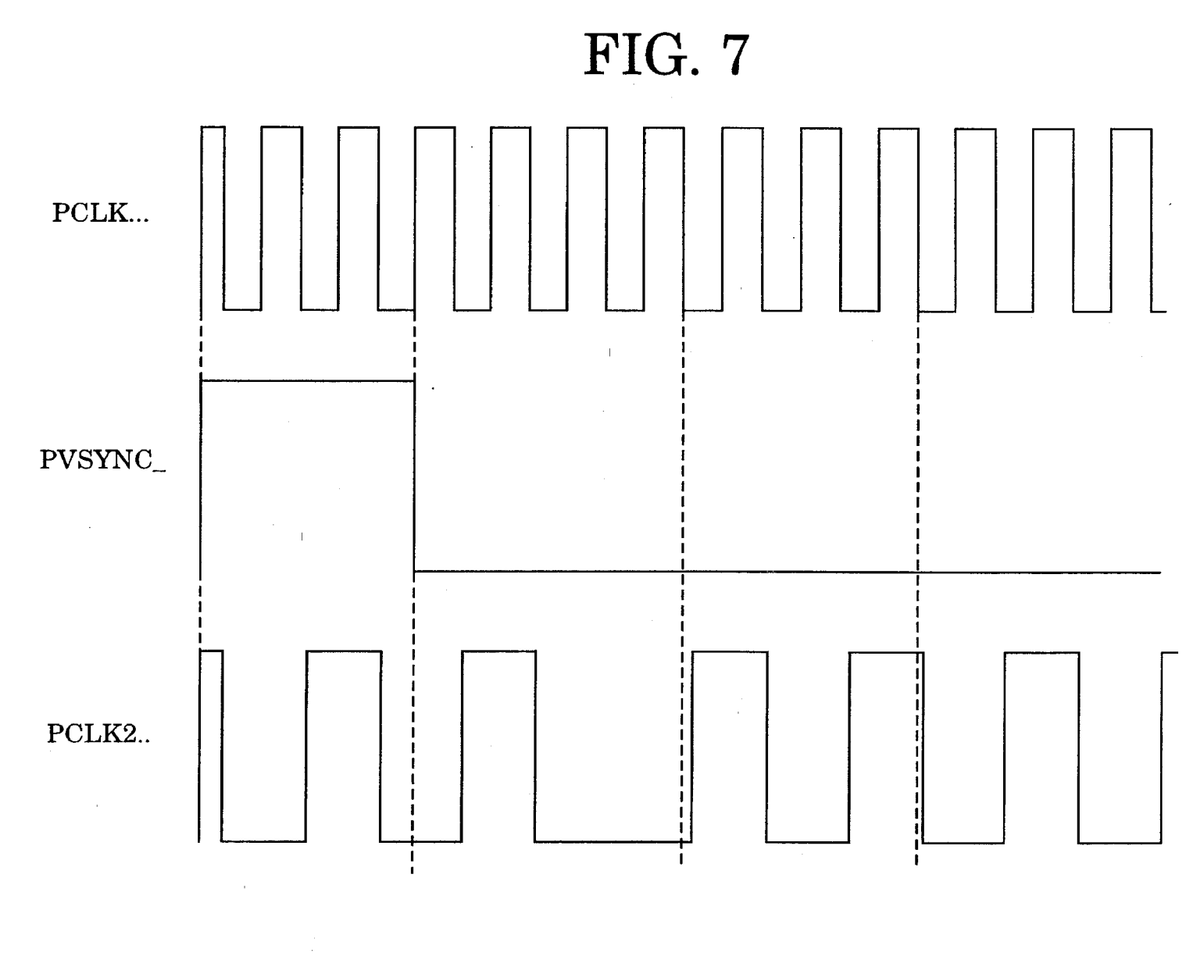
FIG. 7 is a timing diagram illustrating the flat panel pixel clock (PCLK2) synchronized by the vertical sync signal (PVSYNC)

FIG. 7 is a timing diagram illustrating the flat panel pixel clock 200 (PCLK2) synchronized by the vertical sync signal 164 (PVSYNC). The diagram also shows the timing of the pixel clock 166 (PCLK).

Figure 8:
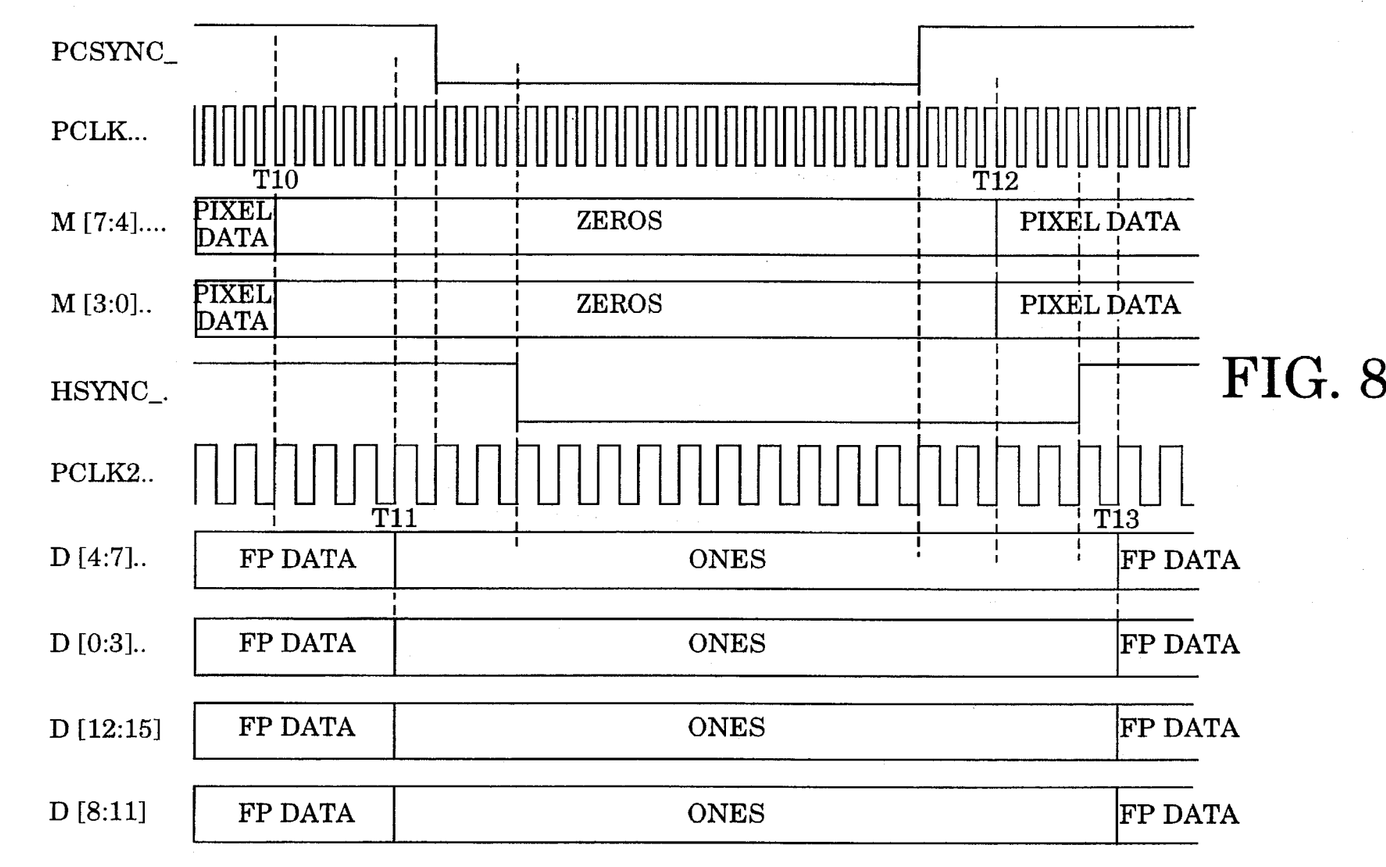
FIG. 8 is a timing diagram illustrating a monochrome flat panel display for one embodiment.

FIG. 8 is a timing diagram illustrating a monochrome flat panel display 26 for one embodiment. The diagram shows a composite sync signal (PCSYNC) and the pixel clock 166 (PCLK). The ramdac data 210 comprises monochrome pixel data bits 4–7 (M[7:4]) received over the digital pixel bus 76. The ramdac data 212 comprises monochrome pixel data bits 0–3 (M[3:0]) received over the digital pixel bus 76. The diagram also illustrates the horizontal sync signal 202 (HSYNC) and the flat pixel clock 200 (PCLK2).

Time T10 is the end of a horizontal scan line for the monochrome CRT display 28. Between times T10 and T12, the monochrome pixel data from the digital pixel output port of the RAMDAC 42 is all zeros. Time T12 is the start of a next scan line for the monochrome CRT display 28.

The flat panel data 220 comprises monochrome flat panel data bits 0–3 (D[0:3]) and the flat panel data 222 comprises monochrome flat panel data bits 4–7 (D[4:7]). Flat panel data 224 comprises monochrome flat panel data bits 8–11 (D[8:11]) and flat panel data 226 comprises monochrome flat panel data bits 12–15 (D[12:15]).

Time T11 is the start of the next horizontal line for the monochrome flat panel display 26 and the start of the corresponding monochrome flat panel data stream (FP DATA). Time T13 is the end of the next horizontal line for the monochrome flat panel display 26. The monochrome flat panel data from the color buffer 44 is all zeros after time T13 and before a subsequent horizontal line begins.

Figure 9:
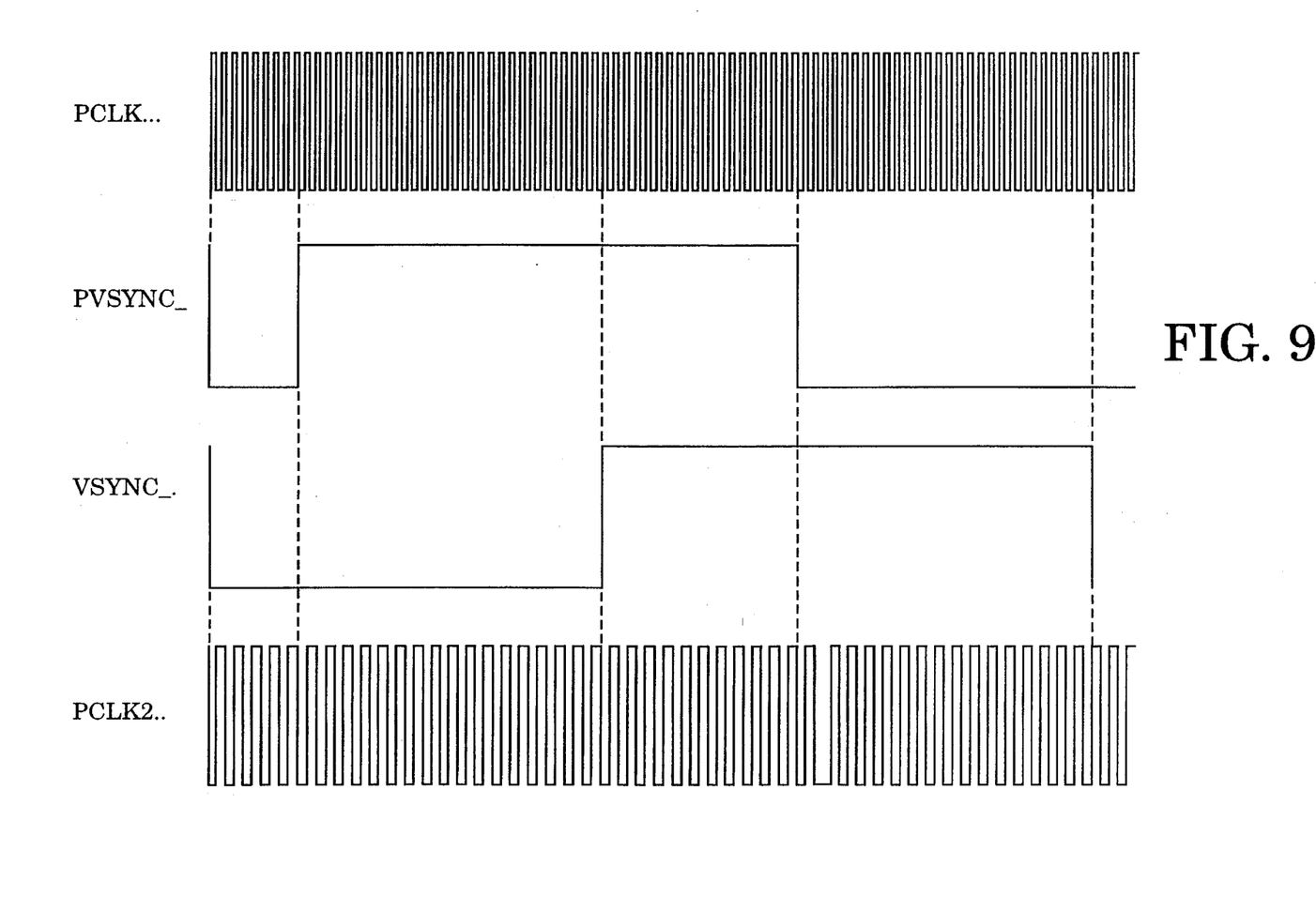
FIG. 9 illustrates the timing of the vertical sync signal (VSYNC) for a monochrome flat panel display.

FIG. 9 illustrates the timing of the vertical sync signal 206 (VSYNC) for a monochrome flat panel display. The vertical sync signal 206 is triggered by the vertical sync signal 164 (PVSYNC). The diagram also shows the timing of the pixel clock 166 (PCLK) and the flat panel pixel clock 200 (PCLK2).

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A graphics circuit for driving one of a cathode ray tube ("CRT") display and a flat panel display, said graphics circuit comprising:

a CRT connector for coupling the CRT display to the graphics circuit;

a flat panel connector for coupling the flat panel display to the graphics circuit;

a frame buffer which contains at least a set of digital pixel data;

a processor coupled to said CRT connector and said frame buffer, said processor senses said CRT connector to determine whether the CRT display is coupled to said CRT connector and transmits at least said set of digital pixel data to said frame buffer;

a ramdac circuit coupled to said processor and said frame buffer, said ramdac circuit includes
   circuitry that generates a set of video sync signals for the CRT display,
   circuitry that performs a color look-up table function on a pixel data stream provided by said frame buffer to produce a color pixel data stream, if the flat panel display is coupled to the graphics circuit and is color or the CRT display is coupled to the graphics circuit, circuitry that generates a set of analog video signals based on the color pixel data stream and said set of video sync signals, if the CRT display is coupled to the graphics circuit, and circuitry that bypasses the color look-up table function on the pixel data stream, if the flat panel display is coupled to the graphics circuit and is monochrome; and a color buffer circuit coupled to said ramdac circuit, said flat panel connector and said processor, said color buffer circuit includes circuitry that automatically senses whether (i) the flat panel display is coupled to the graphics circuit and (ii) the flat panel display is color or monochrome, circuitry that converts the set of video sync signals into a set of color flat panel sync signals, if the flat panel display is coupled to the graphics circuit and is color, and circuitry that converts the video sync signals into a set of monochrome flat panel sync signals, if the flat panel display is coupled to the graphics circuit and is monochrome.

2. The graphics circuit of claim 1, wherein the color buffer circuit includes circuitry that receives the color pixel data stream from the ramdac circuit and that generates a color digital data stream by synchronizing the color pixel data stream to the color flat panel sync signals, if the flat panel display is coupled to the graphics circuit and is color.

3. The graphics circuit of claim 2, wherein the circuitry that generates the color digital data stream synchronized by the color flat panel sync signals includes circuitry that demultiplexes the color pixel data stream, if the flat panel display is coupled to the graphics circuit and is color.

4. The graphics circuit of claim 1, wherein the color buffer circuit includes circuitry that receives the pixel data stream from the ramdac circuit and that generates a monochrome digital data stream by synchronizing the pixel data stream to the monochrome flat panel sync signals, if the flat panel display is coupled to the graphics circuit and is monochrome.

5. The graphics circuit of claim 1, wherein the ramdac circuit includes an analog pixel output port coupled to transfer the set of analog video signals to the CRT display.

6. The graphics circuit of claim 1, wherein the pixel data stream defines an image for display on the flat panel display or the CRT display.

7. The graphics circuit of claim 1, wherein the ramdac circuit includes a digital pixel output port coupled to transfer the pixel data stream to the color buffer circuit.

8. The graphics circuit of claim 1, wherein the color buffer circuit further includes circuitry for sensing a pixel resolution of the flat panel display, if the flat panel display is coupled to the graphics circuit.

9. A method for interfacing a graphics subsystem to a flat panel display or a CRT display, comprising the steps of:

sensing without user intervention whether the CRT display is coupled to the graphics subsystem, wherein if the CRT display is coupled to the graphics subsystem, then converting a digital pixel data stream into a color pixel data stream, converting said color pixel data stream into a set of analog video signals, generating a set of video sync signals to control the CRT display, and transmitting said set of analog video signals and said set of video sync signals to the CRT display; and sensing without user intervention whether the flat panel display is coupled to the graphics subsystem if the CRT display is not coupled to the graphics subsystem, wherein if the flat panel display is coupled to the graphics subsystem, then sensing whether the flat panel display is color or monochrome, converting said set of video sync signals into a set of color flat panel sync signals, if the flat panel display is color, converting said set of video sync signals into a set of monochrome flat panel sync signals, if the flat panel display is monochrome, performing a color look-up table function on said digital pixel data stream, if the flat panel display is color, and bypassing the color look-up table function on said digital pixel data stream, if the flat panel display is monochrome.

10. The method of claim 9, wherein the step of performing a color look-up table function includes the steps of generating a color digital data stream by synchronizing the pixel data stream to the color flat panel sync signals and transferring the color digital data stream and the color flat panel sync signals to the flat panel display, if the flat panel display is color.

11. The method of claim 10, wherein the step of generating a color digital data stream includes the step of demultiplexing the pixel data stream, if the flat panel display is color.

12. The method of claim 9, wherein the step of bypassing the color look-up table function includes the steps of generating a monochrome digital data stream by synchronizing the pixel data stream to the monochrome flat panel sync signals and transferring the monochrome digital data stream and the monochrome flat panel sync signals to the flat panel display, if the flat panel display is monochrome.

13. The method of claim 9, wherein if the CRT display is sensed to be coupled to the graphics subsystem, the method further comprises the step of generating a set of analog video signals for the CRT display by performing the color look-up table function on the pixel data stream to produce a color pixel data stream and by performing a digital to analog conversion function on the color pixel data stream.

14. The method of claim 9 further comprising the step of transferring the analog video signals and the video sync signals to the CRT display.

15. The method of claim 9 further comprising the step of receiving the pixel data stream from a frame buffer that stores an image for display on the flat panel display or the CRT display.

16. The method of claim 9, wherein after the step of sensing whether the flat panel display is color or monochrome, the method further comprises the step of sensing a pixel resolution of the flat panel display.

17. A computer system comprising:

a processor that generates a set of graphics data that defines an image for display on a flat panel display or a cathode ray tube ("CRT") display; and a graphics subsystem coupled to the processor, the graphics subsystem includes a frame buffer, a rendering processor coupled to the processor and the frame buffer, the rendering processor receives the graphics data from the processor, converts the graphics data into digital pixel data and transfers the digital pixel data into the frame buffer, the rendering processor further automatically senses information, subsequently read by the processor, as to whether the CRT display is coupled to the graphics subsystem, a ramdac circuit coupled to the frame buffer and the rendering processor, the ramdac circuit includes circuitry that generates a set of video sync signals for the CRT display, circuitry that performs a color look-up table function on a pixel data stream read from the frame buffer to produce a color pixel data stream, if the flat panel display is coupled to the graphics subsystem and is color or the CRT display is coupled to the graphics subsystem, circuitry that generates a set of analog video signals based on the color pixel data stream and the set of video sync signals, if the CRT display is coupled to the graphics subsystem, and circuitry that bypasses the color look-up table function on the pixel data stream if the flat panel display is coupled to the graphics subsystem and is monochrome, and a color buffer circuit coupled to said ramdac circuit, said flat panel connector, said rendering processor and said processor, said color buffer circuit including circuitry that senses whether the flat panel display is coupled to the graphics subsystem and whether the flat panel display is color or monochrome, said circuitry is read by the processor, circuitry that converts the set of video sync signals into a set of color flat panel sync signals, if the flat panel display is coupled to the graphics subsystem and is color, and circuitry that converts the set of video sync signals into a set of monochrome flat panel sync signals, if the flat panel display is coupled to the graphics subsystem and is monochrome.

18. The computer system of claim 17, wherein the color buffer circuit includes circuitry that receives the color pixel data stream from the ramdac circuit and that generates a color digital data stream by synchronizing the color pixel data stream to the color flat panel sync signals, if the flat panel display is coupled to the graphics subsystem and is color.

19. The computer system of claim 18, wherein the circuitry that generates the color digital data stream synchronized by the color flat panel sync signals includes circuitry that demultiplexes the color pixel data stream, if the flat panel display is coupled to the graphics subsystem and is color.

20. The computer system of claim 17, wherein the color buffer circuit includes circuitry that receives the pixel data stream from the ramdac circuit and that generates a monochrome digital data stream by synchronizing the pixel data stream to the monochrome flat panel sync signals, if the flat panel display is coupled to the graphics subsystem and is monochrome.

21. The computer system of claim 17, wherein the circuitry that generates the set of analog video signals for the CRT display perform the color look-up table function to produce the color pixel data stream and a digital to analog conversion function on the color pixel data stream.

22. The computer system of claim 17, wherein the ramdac circuit includes an analog pixel output port coupled to transfer the analog video signals to the CRT display.

23. The computer system of claim 17, wherein the ramdac circuit includes a digital pixel output port coupled to transfer the pixel data stream to the color buffer circuit.

24. The computer system of claim 17, wherein the color buffer circuit includes circuitry that senses a pixel resolution of the flat panel display, if the flat panel display is coupled to the graphics subsystem.

* * * * *